US012780843B2

(12) United States Patent
Pradhan et al.

(10) Patent No.: US 12,780,843 B2
(45) **Date of Patent: *Nov. 3, 2026**

(54) SYNTHESIS OF COPPER (I) 5-NITROTETRAZOLATE

(71) Applicant: PRIMODIA CHEMICALS AND PHARMACEUTICALS PRIVATE LIMITED, Hyderabad (IN)

(72) Inventors: Braja Sundar Pradhan, Hyderabad, IN (US); Neha Mehta, Picatinny Arsenal, NJ (US); Keyur Patel, Picatinny Arsenal, NJ (US)

(73) Assignee: PRIMODIA CHEMICALS AND PHARMACEUTICALS PRIVATE LIMITED (IN)

( * ) Notice: Subject to any disclaimer, the term of this patent is extended or adjusted under 35 U.S.C. 154(b) by 416 days.

This patent is subject to a terminal disclaimer.

(21) Appl. No.: 18/243,114

(22) Filed: Sep. 7, 2023

(65) Prior Publication Data

US 2024/0043452 A1 Feb. 8, 2024

Related U.S. Application Data

(63) Continuation-in-part of application No. 17/542,235, filed on Dec. 3, 2021, now Pat. No. 11,773,112.

(51) Int. Cl.
*C07F 1/00* (2006.01)
*C07F 1/08* (2006.01)

(52) U.S. Cl.
CPC .................................... *C07F 1/08* (2013.01)

(58) Field of Classification Search
CPC ........................................................ C07F 1/08
USPC ........................................................ 548/101
See application file for complete search history.

(56) References Cited

U.S. PATENT DOCUMENTS 9,440,934 B1 * 9/2016 Mehta .................. C07D 257/06
11,773,112 B2 * 10/2023 Pradhan .................... C07F 1/08
548/104

* cited by examiner

*Primary Examiner* — Charanjit Aulakh

(57) ABSTRACT

The present invention relates to a method of synthesizing copper (I) 5-nitrotetrazolate. The method involves a series of interconnected steps. Initially, a stock solution of sodium 5-nitrotetrazolate is prepared in water from 5-aminotetrazole nitrate, which is then preserved for later use in producing copper (I) 5-nitrotetrazolate thereby eliminating the need for immediate utilization. A nascent Copper (I) chloride is prepared separately. In a single step, the stock solution of sodium 5-nitrotetrazolate is coupled with the nascent copper (I) chloride, resulting in the formation of copper (I) 5-nitrotetrazolate.

11 Claims, No Drawings

SYNTHESIS OF COPPER (I) 5-NITROTETRAZOLATE

CROSS-REFERENCE TO RELATED APPLICATIONS

This patent application claims the priority benefit of US Continuation-in-Part (CIP) patent application Ser. No. 17/542,235, entitled, "Synthesis of tetrazolate salts" filed on 3 Dec. 2021. The entire contents of the patent application are hereby incorporated by reference herein in its entirety.

COPYRIGHT AND TRADEMARK NOTICE

This application includes material that may subject or may be subject to copyright and/or trademark protection. The copyright and trademark owner(s) has no objection to the facsimile reproduction by any patent disclosure, as it appears in the Patent and Trademark Office files or records, but otherwise reserves all copyright and trademark rights.

TECHNICAL FIELD

The disclosed subject matter relates generally to the field of tetrazole chemistry. The present disclosure particularly relates to a novel, practical method of preparing copper (I) 5-nitrotetrazolate.

BACKGROUND

5-Nitrotetrazolate salts find widespread industrial applications in the mining and construction industries. They offer a suitable alternative to lead azide, a toxic and environmentally harmful compound in these industries.

The current preferred method for preparing copper (I) 5-nitrotetrazolate is described in the article titled "Development of a Lean Process to the Lead-Free Primary Explosive DBX-1," published in "Organic Process Research & Development, 2015, 19, 6, 673-680." This process involves coupling sodium 5-nitrotetrazolate with copper (II) chloride and a reductant, specifically sodium ascorbate. However, this process is complex and cumbersome. Additionally, the outcome of the process is often unpredictable, requiring the addition of pure copper (I) 5-nitrotetrazolate to the aqueous reaction mixture for the successful isolation of the product. These limitations make the process impractical for the commercial production of copper (I) 5-nitrotetrazolate.

Given the aforementioned challenges, there is a clear need to develop an alternative, safer process for the production of this material.

SUMMARY

The following presents a simplified summary of the disclosure to provide a basic understanding of the reader. This summary is not an extensive overview of the disclosure and needs to identify key/critical elements of the invention or delineate the scope of the invention. Its sole purpose is to present some concepts disclosed herein in a simplified form as a prelude to the more detailed description.

Exemplary embodiments of the present disclosure are directed towards synthesizing copper (I) 5-nitrotetrazolate.

An objective of the present disclosure is directed towards adopting a straightforward and reliable method for preparing copper (I) 5-nitrotetrazolate.

Another objective of the present disclosure is directed towards a method for preparing an aqueous solution of sodium 5-nitrotetrazolate.

Another objective of the present disclosure is to prepare a cuprous salt, preferably, a nascent copper (I) chloride.

Another objective of the present disclosure is to prepare a copper (I) halide, preferably, a nascent copper (I) chloride.

Another objective of the present disclosure is to carry the nascent copper (I) salt over as a wet cake.

Another objective of the present disclosure is directed towards simplifying the synthesis process, including the isolation of copper (I) 5-nitrotetrazolate, by utilizing a suitable cuprous salt, preferably, a nascent copper (I) chloride.

Another objective of the present disclosure is directed towards simplifying the synthesis process, including the isolation of copper (I) 5-nitrotetrazolate, by utilizing a copper (I) halide, preferably, a nascent copper (I) chloride.

An objective of the present disclosure is directed towards a method for preparing copper (I) 5-nitrotetrazolate in a single step by coupling sodium 5-nitrotetrazolate with a nascent copper (I) chloride.

Another objective of the present disclosure is to eliminate the need for isolating the tetrazolate from water.

Another objective of the present disclosure is to eliminate the necessity of seeding the reaction mixture to induce precipitation.

Another objective of the present disclosure is to eliminate the necessity of adding a reductant to the reaction mixture to prepare the cuprous salt for the coupling.

Another objective of the present disclosure is to eliminate the necessity of adding copper (I) chloride, which is highly prone to degradation on exposure to air, obtained from third party sources.

Another objective of the present disclosure is to develop a reliable and reproducible method that ensures copper (I) 5-nitrotetrazolate production with exceptional purity.

Another objective of the present disclosure is to allow flexibility in using an aqueous solution of sodium 5-nitrotetrazolate by eliminating the need for immediate utilization after its preparation.

Another objective of the present disclosure is to preserve an aqueous solution of sodium 5-nitrotetrazolate, allowing it to be used as and when needed without any loss of purity.

According to an exemplary aspect, a method of synthesis of copper (I) 5-nitrotetrazolate involves the following steps. Firstly, an aqueous solution of sodium 5-nitrotetrazolate is prepared using 5-aminotetrazole nitrate. This resulting aqueous solution of sodium 5-nitrotetrazolate is preserved as a stock solution for future use. A nascent Copper (I) chloride is also prepared as part of the process. In a single step, the aqueous solution of sodium 5-nitrotetrazolate is coupled with a nascent copper (I) chloride, forming copper (I) 5-nitrotetrazolate. By following this method, the synthesis of copper (I) 5-nitrotetrazolate can efficiently be achieved.

According to an exemplary aspect, preparing an aqueous solution of sodium 5-nitrotetrazolate involves the following steps. First, a salt of 5-aminotetrazole is used as a starting compound. Then, an acid is added to an aqueous mixture containing the salt of 5-aminotetrazole, sodium nitrite ($NaNO_2$), and a copper salt or its hydrated form, at a suitable temperature, forming the reaction mixture. The mixture is then stirred and heated, resulting in the formation of 5-nitrotetrazole in situ. Next, sodium hydroxide (NaOH) solution in water is added to the reaction mixture at a particular temperature. This conversion step converts the 5-nitrotetrazole into its sodium salt in situ, forming a precipitated dark compound. Finally, the precipitated dark compound is filtered off to obtain a filtrate containing sodium 5-nitrotetrazolate. By following this method, an aqueous solution of sodium 5-nitrotetrazolate can efficiently be prepared.

According to another exemplary aspect, the salt of 5-aminotetrazole used in the method should be a nitrate salt of 5-aminotetrazole. In another embodiment, the acid added to the aqueous mixture is specifically nitric acid ($HNO_3$), with a preference for 65% nitric acid ($HNO_3$). Furthermore, in yet another embodiment, the acid is added to the aqueous mixture at a temperature ranging from 5 to 20° C.

According to another exemplary aspect, the reaction mixture is stirred at 10 to 15° C. for 10 minutes to 3 hours. Subsequently, the reaction mixture is heated to 100° C. and maintained at this temperature until the reaction is complete, resulting in the in situ formation of 5-nitrotetrazole. In another embodiment, the aqueous solution of sodium hydroxide (NaOH) is added to the reaction mixture containing the 5-nitrotetrazole at a temperature ranging from 60° C. to 100° C. until the pH of the reaction mixture becomes basic.

According to another exemplary aspect, preparing the copper (I) salt, preferably a nascent copper (I) chloride, involves reducing the oxidation state of copper in copper sulfate or its hydrated form, copper sulfate pentahydrate, to obtain cuprous cations. These cuprous cations are then trapped in situ by the generated anions, in the example given here, the chloride anions, resulting in the formation of cuprous chloride. Sodium bisulfite and sodium chloride are chosen as the reductant and the source of chloride anion, respectively. The reaction takes place in water. Once the reaction is complete, the formed nascent copper (I) chloride precipitates as a white solid from the aqueous reaction medium. To minimize degradation upon exposure to air, the solid is washed but not isolated by filtration.

DETAILED DESCRIPTION OF EXAMPLE EMBODIMENTS

The detailed description and examples illustrate the principles of the present subject matter. It should be appreciated by those skilled in the art that conception and specific embodiments disclosed may readily be utilized as a basis for modifying or designing other methods for carrying out the same purposes of the present subject matter. Furthermore, all examples recited herein are principally intended expressly to be for pedagogical purposes to aid the reader in understanding the principles of the present subject matter and the concepts contributed by the inventor(s) to furthering the art and are to be construed as being without limitation to such expressly recited examples and conditions. The novel features which are believed to be characteristic of the present subject matter, both as to its organization and method of operation, together with further objects and advantages will be better understood from the following description when considered in connection with the accompanying examples.

These and other advantages of the present subject matter would be described in greater detail with reference to the following examples. The description merely illustrates the principles of the present subject matter. It is appreciated that those skilled in the art can devise various arrangements that, although not explicitly described herein, embody the principles of the present subject matter and are included within its scope.

According to another exemplary embodiment of the present disclosure, synthesizing copper (I) 5-nitrotetrazolate involves coupling a cuprous salt, preferably, a nascent copper (I) chloride with sodium 5-nitrotetrazolate. The sodium 5-nitrotetrazolate is prepared from the nitrate salt of 5-aminotetrazole. The primary reason and advantage of initiating the synthesis by preparing the sodium salt of 5-nitrotetrazole using a salt of 5-aminotetrazole is twofold. Firstly, it eliminates the safety concerns associated with Sandmeyer reaction conditions. Secondly, it significantly enhances the ease of executing the synthetic protocol, making the process safe and suitable for the commercial manufacturing of the copper (I) 5-nitrotetrazolate.

According to another exemplary embodiment of the present disclosure, the method of preparing sodium 5-nitrotetrazolate comprising series of interconnected steps. First, a salt of 5-aminotetrazole nitrate is utilized as the starting compound for synthesizing copper (I) 5-nitrotetrazolate. In the next step, an acid is added to an aqueous mixture containing the salt of 5-aminotetrazole, sodium nitrite ($NaNO_2$), and a copper salt or its hydrated form. This mixture is heated to a suitable temperature, resulting in the formation of a reaction mixture. The subsequent step involves stirring and heating the reaction mixture, forming 5-nitrotetrazole in situ. To convert the formed 5-nitrotetrazole into its sodium salt in situ, an aqueous solution of sodium hydroxide (NaOH) is added at a specific temperature in the following step. This addition also causes the precipitation of a dark compound. In the final step, the precipitated dark compound is filtered off from the reaction mixture, yielding a filtrate containing the desired sodium salt of 5-nitrotetrazole. By following this method, the preparation of sodium 5-nitrotetrazolate can effectively be accomplished.

According to another exemplary embodiment of the present disclosure, the process of preparing the desired cuprous salt, namely, a nascent copper (I) chloride, involves a series of steps designed to lower the oxidation state of copper in the preferred copper (II) salt, namely, copper sulfate pentahydrate, ultimately resulting in the formation of cuprous chloride. To achieve this, sodium bisulfite is chosen as the reductant, effectively reducing the copper ions to cuprous cations. Sodium chloride is selected as the source of chloride anions, which readily combine with the cuprous cations to yield cuprous chloride. The reaction occurs in an aqueous medium. Upon completion of the reaction, a nascent copper (I) chloride precipitates out of the solution as a white solid. To minimize the degradation of the solid upon exposure to air, it is washed but not isolated through filtration. Instead, it is carried over as a wet cake after washings for the coupling.

According to another exemplary embodiment of the present disclosure, the wet cake of a nascent copper (I) chloride is then utilized for its subsequent coupling with sodium 5-nitrotetrazolate. This coupling process is greatly simplified by employing a nascent copper (I) chloride as the reagent of choice. Additionally, this approach eliminates the need to seed the reaction mixture to precipitate the desired copper (I) 5-nitrotetrazolate. By adopting this methodology, the synthesis becomes more streamlined, facilitating the isolation of copper (I) 5-nitrotetrazolate from the aqueous reaction mixture.

In certain exemplary embodiments, the present invention contemplates the use of a copper (I) halide, preferably, a nascent copper (I) chloride. These examples are provided for illustrative purposes and do not restrict the broader range of possible copper (I) salts that can be utilized within the scope of this invention.

Working Example: 1

The addition of a rapid aqueous solution containing a mixture of sodium hydroxide (8.5 g) and sodium bisulfite (18.4 g) to another aqueous solution consisting of a mixture of copper sulfate pentahydrate (40 g) and sodium chloride (20.9 g). This addition takes place at a temperature range of 70-75° C. The resulting mixture is then stirred at this temperature for 2-5 minutes, precipitating a white-colored solid from the reaction mixture.

Allowing the precipitated solid to settle, the aqueous layer is separated, and the solid is washed with water (3×300 ml). Following the washing steps, the wet solid is introduced into an aqueous stock solution of sodium 5-nitrotetrazolate (1.243 kg, approximately 2-5% w/w) at a temperature of 100° C. The mixture is maintained at this temperature for 3 hours, during which a colored solid precipitates out from the mixture.

Subsequently, the mixture is cooled to room temperature, and the upper layer is removed. The remaining mixture is washed repeatedly with water until all foreign materials are removed. The resulting maroon-colored solid is then filtrated and washed with water and isopropyl alcohol. Finally, the solid is dried, producing copper (I) 5-nitrotetrazolate as a maroon-colored solid with a yield of 16.5 g.

This working example highlights the step-by-step procedure, including adding reagents, precipitation, separation, washing, and final drying, successfully synthesizing copper (I) 5-nitrotetrazolate.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles of the invention. Therefore, the above descriptions and figures are to be regarded as illustrative and not restrictive.

Thus, the scope of the present disclosure is defined by the appended claims and includes combinations and sub-combinations of the various features described hereinabove and variations and modifications thereof, which would occur to persons skilled in the art upon reading the preceding description.

What is claimed is:

1. A method of synthesis of copper (I) 5-nitrotetrazolate, the method consisting of:

coupling an already prepared stock solution of sodium 5-nitrotetrazolate with a wet cake of nascent copper (I) chloride in a single step to synthesize copper (I) 5-nitrotetrazolate.

2. The method of claim 1, wherein preparing the stock solution of sodium 5-nitrotetrazolate consists of:

a) utilizing 5-aminotetrazole nitrate as a starting compound;

b) adding an acid to an aqueous mixture to obtain a reaction mixture, wherein the aqueous mixture consists of 5-aminotetrazole nitrate, sodium nitrite ($NaNO_2$), and a copper salt or its hydrated form;

c) heating and stirring the reaction mixture to facilitate in situ formation of 5-nitrotetrazole;

d) introducing an aqueous solution of sodium hydroxide (NaOH) at a temperature in a range of 60 to 100° C. to covert 5-nitrotetrazole to obtain sodium salt of 5-nitrotetrazole in situ and causing the precipitation of a dark compound;

e) filtering off the dark compound from the reaction mixture, resulting in a filtrate containing the sodium 5-nitrotetrazole to obtain the stock solution.

3. The method of claim 1, wherein obtaining the nascent Copper (I) chloride consists of:

utilizing sodium bisulfite as a reductant to reduce copper ions to cuprous cations;

employing sodium chloride as a source of chloride anions to facilitate a combination with cuprous cations to form a solution of cuprous chloride in an aqueous medium using water as the solvent;

allowing copper (I) chloride to precipitate from the solution of cuprous chloride as a white solid;

washing the white solid to minimize degradation upon exposure to air, wherein the white solid is isolated without filtration; and maintaining the white solid as the wet cake of the nascent copper (I) chloride.

4. The method of claim 1, wherein the stock solution of sodium 5-nitrotetrazolate eliminates a need to isolate sodium 5-nitrotetrazolate from water.

5. The method of claim 2, wherein the acid added to the aqueous mixture is 65% nitric acid ($HNO_3$).

6. The method of claim 2, wherein the acid is added to the aqueous mixture at a temperature in a range of 5 to 20° C.

7. The method of claim 2, wherein the copper salt or its hydrated form is one of copper (I) sulphate or copper (I) sulfate pentahydrate.

8. The method of claim 2, wherein the reaction mixture is stirred at a temperature in a range of 10 to 15° C. for 10 minutes to 3 hours, and heating the reaction mixture to 100° C. and maintaining at 100° C. until the reaction is complete, resulting in the formation of 5-nitrotetrazole in situ.

9. The method of claim 2, wherein the aqueous solution of sodium hydroxide (NaOH) is added to 5-nitrotetrazole at a temperature ranging from 60° C. to 100° C. until pH of the reaction mixture is turned basic.

10. The method of claim 2, wherein the filtrate containing the sodium salt of 5-nitrotetrazole is heated to 100° C., followed by the addition of a nascent copper (I) chloride and is maintained at 100° C. until the precipitation of copper (I) 5-nitrotetrazolate.

11. The method of claim 3, wherein the copper ions present in the aqueous solution are converted in situ to cuprous cations using sodium bisulfite.

* * * * *